US011966899B2

(12) United States Patent
Adachi

(10) Patent No.: US 11,966,899 B2
(45) Date of Patent: Apr. 23, 2024

(54) INFORMATION PROCESSING SYSTEM, INFORMATION TERMINAL, INFORMATION PROCESSING DEVICE, AND CONTROL PROGRAM

(71) Applicant: TOSHIBA TEC KABUSHIKI KAISHA, Tokyo (JP)

(72) Inventor: Kazunobu Adachi, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 66 days.

(21) Appl. No.: 17/553,698

(22) Filed: Dec. 16, 2021

(65) Prior Publication Data

US 2022/0292478 A1 Sep. 15, 2022

(30) Foreign Application Priority Data

Mar. 12, 2021 (JP) ................................ 2021-039856

(51) Int. Cl.
*G06Q 20/20* (2012.01)
*G06K 7/14* (2006.01)

(52) U.S. Cl.
CPC ......... *G06Q 20/202* (2013.01); *G06K 7/1413* (2013.01); *G06Q 20/208* (2013.01)

(58) Field of Classification Search
CPC .. G06Q 20/202; G06Q 20/208; G06Q 10/087; G06K 7/1413
USPC ........................................................ 705/28
See application file for complete search history.

(56) References Cited

U.S. PATENT DOCUMENTS

2005/0035198 A1* 2/2005 Wilensky .............. B62B 3/1424 235/383
2005/0230472 A1* 10/2005 Chang ...................... G07G 1/14 235/383
2016/0086148 A1* 3/2016 Katsumura ....... G06F 18/24133 705/23

(Continued)

FOREIGN PATENT DOCUMENTS

JP 2019-053735 A 4/2019

OTHER PUBLICATIONS

Extended European Search Report dated Aug. 1, 2022, in corresponding European Patent Application No. 22155990.9, 8 pages.

*Primary Examiner* — Ariel J Yu
*Assistant Examiner* — Denisse Y Ortiz Roman
(74) *Attorney, Agent, or Firm* — Kim & Stewart LLP

(57) ABSTRACT

A point of sales (POS) system includes a server configured to store a list of commodities registered for purchase in association with identification information about a customer and a terminal comprising first and second scanners through which a commodity code is read. The terminal is configured to acquire identification information, upon reading of a commodity code through the first scanner, transmit first data including the commodity code and the identification information to the server, and upon reading of a commodity code through the second scanner, transmit second data including the commodity code and the identification information to the server. The server is configured to, upon receipt of the first data, register the commodity having the commodity code in the first data in the list, and upon receipt of the second data, delete the commodity having the commodity code in the second data from the list.

19 Claims, 12 Drawing Sheets

(56) References Cited

U.S. PATENT DOCUMENTS

| | | | |
|---|---|---|---|
| 2017/0161707 A1 | 6/2017 | Chin et al. | |
| 2017/0280290 A1 | 9/2017 | Jones et al. | |
| 2019/0073656 A1 | 3/2019 | Joseph et al. | |
| 2019/0272400 A1* | 9/2019 | Naito | B62B 3/1412 |

* cited by examiner

FIG. 4
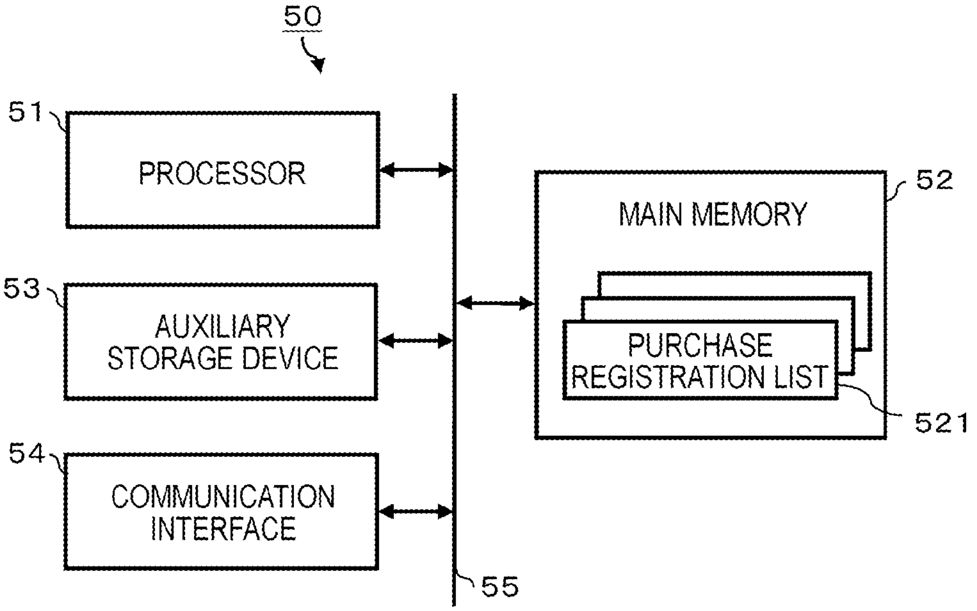
FIG. 5
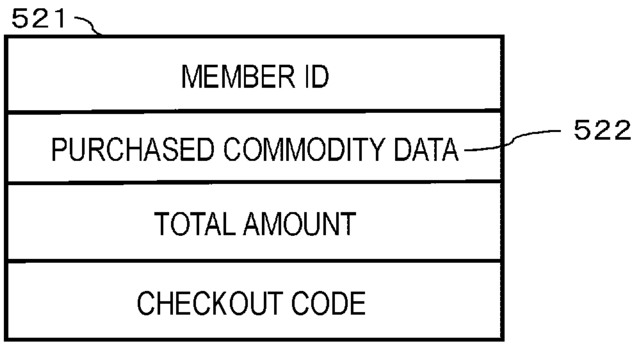
FIG. 6
522
| No. | COMMODITY CODE | COMMODITY NAME | PRICE | NUMBER OF PURCHASED ITEMS | PURCHASE AMOUNT | CANCELLATION FLAG |
|---|---|---|---|---|---|---|
| 1. | | | | | | |
| 2. | | | | | | |
| ⋮ | ⋮ | ⋮ | ⋮ | ⋮ | ⋮ | ⋮ |

PURCHASE REGISTRATION SCREEN — 200

| COMMODITY NAME | UNIT PRICE | NUMBER OF ITEMS | PURCHASE AMOUNT |
|---|---|---|---|
| | | | |

TOTAL AMOUNT

CHECKOUT — 201

— 300

SAME COMMODITY IS ALREADY REGISTERED.

COMMODITY AAA          100 YEN

WANT TO ADD SAME COMMODITY?

ADD — 301

CANCEL — 302

PURCHASE REGISTRATION CANCELATION SCREEN — 400

| COMMODITY NAME | UNIT PRICE | NUMBER OF ITEMS | PURCHASE AMOUNT |
|---|---|---|---|
| AAA | 100 YEN | 2 | 200 YEN |
| ~~BBB~~ | ~~200 YEN~~ | ~~1~~ | ~~200 YEN~~ |
| CCC | 150 YEN | 1 | 150 YEN |

TOTAL AMOUNT     350 YEN

[ CHECKOUT ] — 201

— 500

ERROR

CANCELLATION OF AN UNREGISTERED COMMODITY.

[ CONFIRM ] — 501

INFORMATION PROCESSING SYSTEM, INFORMATION TERMINAL, INFORMATION PROCESSING DEVICE, AND CONTROL PROGRAM

CROSS-REFERENCE TO RELATED APPLICATION

This application is based upon and claims the benefit of priority from Japanese Patent Application No. 2021-039856, filed Mar. 12, 2021, the entire contents of which are incorporated herein by reference.

FIELD

Embodiments described herein relate generally to an information processing system, an information terminal, an information processing device, and a control program thereof.

BACKGROUND

In recent years, cart-mounted point of sales (POS) systems has been proposed for retail stores equipped with shopping carts. Such "cart POS systems," typically include an information terminal equipped with a touch panel and a product scanner (e.g., a barcode reader or the like) on the shopping cart. When a customer uses the shopping cart puts a commodity to be purchased, in the shopping cart, the customer registers the item for purchase by scanning an identification code on the item using the scanner. On the other hand, when canceling the registration of an item, the customer must operate the touch panel to perform cancelation operations, which are relatively complicated. Therefore, there is a demand for a technique capable of canceling commodity registration by simpler operations.

BRIEF DESCRIPTION OF THE DRAWINGS

FIG. 4 is a hardware block diagram of a virtual POS server.

FIG. 5 depicts a data structure of a purchase registration list.

FIG. 6 depicts a data structure of purchased commodity data.

DETAILED DESCRIPTION

In general, according to at least one embodiment, there are provided an information processing system, an information terminal, an information processing device, and a control program thereof capable of canceling commodity registration by simple user operations.

In one embodiment, a point of sales (POS) system includes a POS server configured to store a list of commodities registered for purchase in association with identification information that identifies a customer, and a POS terminal comprising first and second scanners through which a commodity code of a commodity is read. The POS terminal is configured to acquire identification information that identifies a customer, upon reading of a commodity code through the first scanner, transmit first data including the commodity code and the acquired identification information to the POS server, and upon reading of a commodity code through the second scanner, transmit second data including the commodity code and the acquired identification information and different from the first data, to the POS server. The POS server is further configured to, upon receipt of the first data, register the commodity having the commodity code included in the first data in the list, and upon receipt of the second data, delete the commodity having the commodity code included in the second data from the list.

Hereinafter, certain example embodiments will be described with reference to the drawings. In an embodiment, a tablet terminal (also referred to as a cart terminal) attached to a shopping cart is used as an information terminal.

Figure 1:
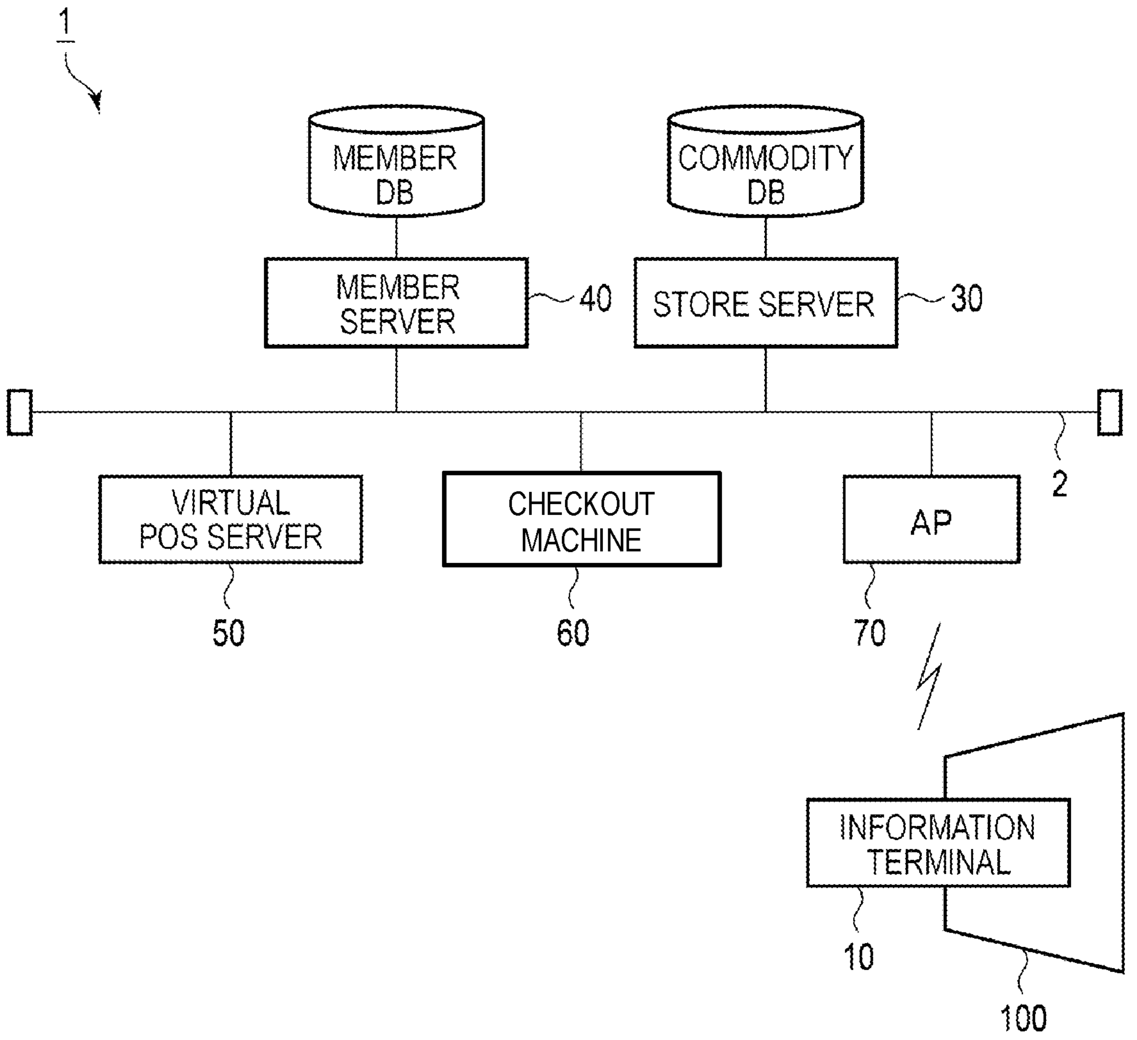
FIG. 1 is a schematic diagram illustrating an information processing system according to an embodiment.

FIG. 1 is a schematic diagram illustrating an information processing system 1 according to an embodiment.

The information processing system 1 is a POS system that includes an information terminal 10, a store server 30, a member server 40, a virtual POS server 50, a checkout machine 60, and an access point 70. The store server 30, the member server 40, the virtual POS server 50, the checkout machine 60, and the access point 70 are connected to a network 2 such as a local area network (LAN). The information terminal 10 includes a wireless unit 14 (see FIG. 2) so as to wirelessly communicate with the access point 70. The access point 70 relays communication between the devices connected to the network 2, that is, the store server 30, the member server 40, the virtual POS server 50, and the checkout machine 60, and the information terminal 10. Although only one access point 70 is illustrated in FIG. 1, there may be two or more access points 70 depending on a size of a store and the like.

The information terminal 10 is a mobile POS terminal that enables a user to input data related to registration of a commodity to be purchased. In the description, a commodity to be purchased by a customer is usually referred to as a "purchased commodity" though formal checkout/payment for such items may have not yet been completed. The information terminal 10 is provided on a shopping cart 100. Hereinafter, the shopping cart 100 is simply referred to as the cart 100. An information terminal 10 is provided on each of a plurality of carts 100. Each cart 100 is a carrier for the user to carry the purchased commodities.

The store server 30 manages a commodity database. The commodity database stores a plurality of commodity data records for the commodities sold in a store. Each of the commodity data records includes information items such as a commodity code, a commodity name, and a unit price. The commodity code is commodity identification data set on a per commodity item basis in order to identify the commodity. The unit price is a price per item of the commodity.

The member server 40 manages a member database. The member database stores a plurality of member data records on member data. Each of the member data records includes items such as a member ID, name, gender, and e-mail address. The member ID is a member identification code.

The virtual POS server 50 cooperates with the information terminal 10 to achieve the functions of a POS device, which is conventionally installed at a checkout lane in a store.

The checkout machine 60 is a device that enables a clerk or a user to perform checkout for the purchased commodity. The number of checkout machines 60 is not particularly limited.

Figure 2:
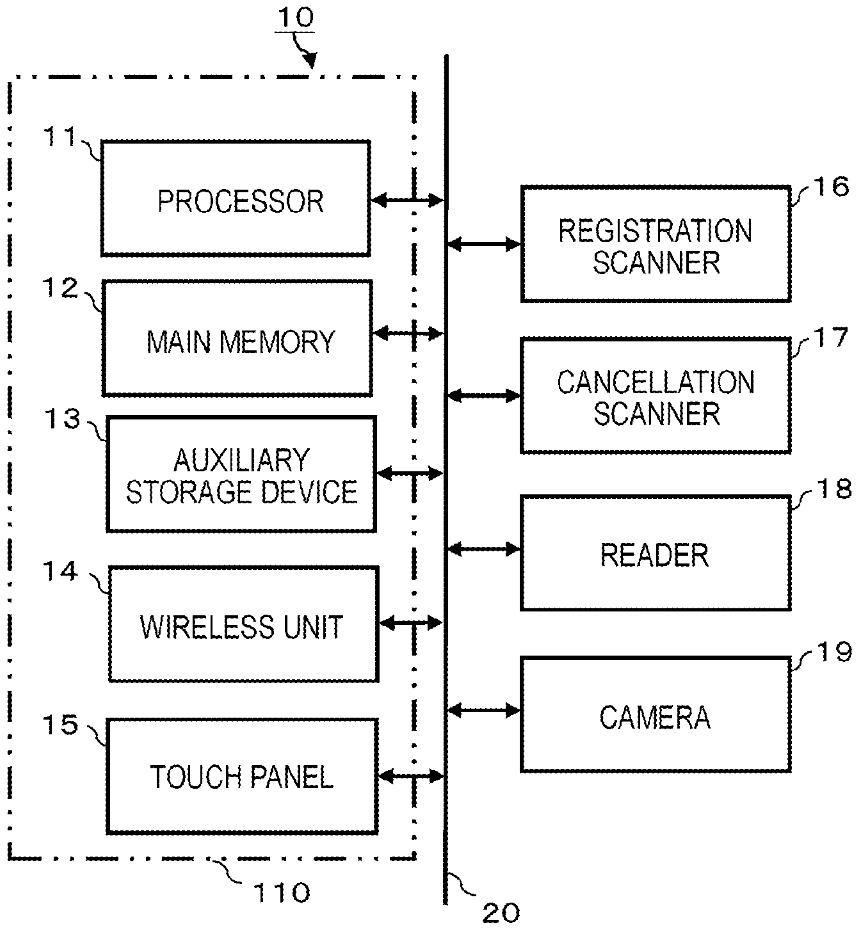
FIG. 2 is a hardware block diagram of an information terminal.

FIG. 2 is a hardware block diagram of the information terminal 10. The information terminal 10 includes a processor 11, a main memory 12, an auxiliary storage device 13, the wireless unit 14, a touch panel 15, a registration scanner 16, a cancelation scanner 17, a reader 18, a camera 19, and a system transmission line 20. For example, the system transmission line 20 is an address bus, a data bus, a control signal line, or the like. In the information terminal 10, the processor 11, the main memory 12, the auxiliary storage device 13, the wireless unit 14, the touch panel 15, the registration scanner 16, the cancelation scanner 17, the reader 18, and the camera 19 are connected to the system transmission line 20.

The processor 11 controls each component of the information terminal 10 in order to perform various functions thereof according to an operating system and/or one or more application programs. The processor 11 is, for example, a central processing unit (CPU).

The main memory 12 includes a nonvolatile memory area and a volatile memory area. The nonvolatile memory area of the main memory 12 stores the operating system and/or the application programs. The volatile and/or non-volatile memory areas may store data necessary for the processor 11 to control each component of the information terminal 10. The volatile memory area of the main memory 12 is used as a work area in which data is temporarily stored by the processor 11. The nonvolatile memory area is, for example, a read-only memory (ROM). The volatile memory area is, for example, a random access memory (RAM).

The auxiliary storage device 13 is, for example, an electrically erasable programmable read-only memory (EEPROM), a hard disc drive (HDD), a solid state drive (SSD), or the like. The auxiliary storage device 13 stores data used when the processor 11 performs various kinds of processes, or data created by the process of the processor 11, and the like. The auxiliary storage device 13 may store the application programs described above.

The application programs stored in the main memory 12 or the auxiliary storage device 13 include a control program for information processing executed by the information terminal 10. A method of installing the control program in the main memory 12 or the auxiliary storage device 13 is not particularly limited. The control program can be installed in the main memory 12 or the auxiliary storage device 13 from a removable recording medium or distributed by communication via a network. The recording medium may be in any form such as a CD-ROM or a memory card as long as the medium can store the control program and is readable by the information terminal 10.

The wireless unit 14 wirelessly communicates data with the access point 70 according to a wireless communication protocol.

The touch panel 15 is a device that includes both an input device and a display device. The touch panel 15 detects a touch position with respect to a displayed image and outputs the touch position information thereof to the processor 11.

The registration scanner 16 and the cancelation scanner 17 read a code symbol such as a barcode and a two-dimensional barcode attached to a commodity. A barcode indicating a commodity code of the commodity is attached to the commodity. When the barcode is read by the registration scanner 16, the commodity code is input to the information terminal 10. That is, the commodity identified by the commodity code is registered. The registration scanner 16 can also be referred to as a first reading unit. When the barcode is read by the cancelation scanner 17, the commodity code is canceled from the information terminal 10. That is, the commodity identified by the commodity code is canceled. The cancel scanner 17 can also be referred to as a second reading unit. The registration scanner 16 and the cancelation scanner 17 may be of a type that reads a code symbol by scanning a laser beam, or may be of a type that reads the code symbol from an image captured by an imaging device, e.g., a camera.

The reader 18 reads data recorded on a recording medium and outputs the read data to the processor 11. The reader 18 is a magnetic card reader when the recording medium is a magnetic card, and is an IC card reader when the recording medium is a contact type IC card. In the case of a recording medium using radio frequency identification (RFID) such as a contactless IC card or a smartphone, an RFID reader is used as the reader 18.

The camera 19 is provided on the cart 100 so that a shopping basket 150 (see FIG. 3) placed in a basket receiving portion 140 (see FIG. 3) of the cart 100 can be photographed from above. The camera 19 is a device for monitoring whether the user of the cart 100 correctly places the purchased commodity into the shopping basket 150.

In the information terminal 10 including the components described above, the processor 11, the main memory 12, the auxiliary storage device 13, the wireless unit 14, and the touch panel 15 make up a tablet terminal 110. In the information terminal 10, the registration scanner 16, the cancel scanner 17, the reader 18, and the camera 19 are electrically connected to the tablet terminal 110.

Figure 3:
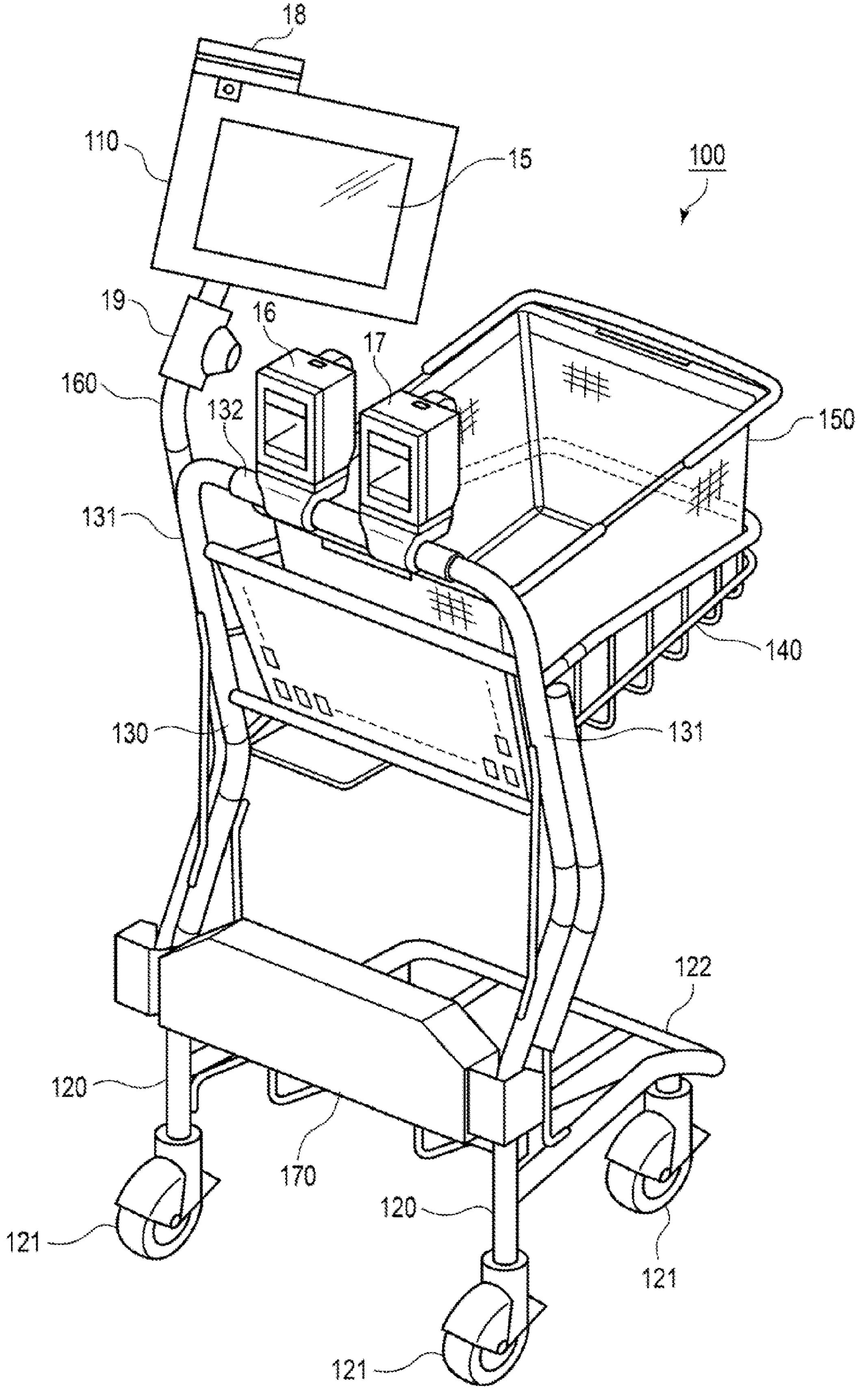
FIG. 3 is a perspective view illustrating an example of a shopping cart provided with an information terminal.

FIG. 3 is a perspective view of the cart 100 on which the information terminal 10 is provided. The cart 100 includes a caster portion 120 for movement, a handle frame portion 130, and the basket receiving portion 140. The caster portion 120 has four casters 121 for smooth movement on a floor surface. The caster portion 120 includes a receiving portion 122 for storing large commodities that do not fit into the shopping basket 150. The handle frame portion 130 includes a pair of vertical frames 131 erected on the rear caster side of the caster portion 120, and a handlebar 132 connecting the upper ends of the vertical frames 131. The basket receiving portion 140 is located in front of the middle portion of the handle frame portion 130. The backset receiving portion 140 of the cart 100 can store a shopping basket 150 provided in the store for storing commodities.

The registration scanner 16 and the cancelation scanner 17 are located in the middle of the handlebar 132. The registration scanner 16 and the cancelation scanner 17 are attached to the handlebar 132 so that those reading windows face the front side. The front side is a side on which the user who holds the handlebar 132 and pushes the cart 100 stands. In the present embodiment, it is assumed that the registration scanner 16 is attached to the left side of the handlebar 132, and the cancelation scanner 17 is attached to the right side of the handlebar 132 when viewed from the user.

A pole 160 is attached to one of the vertical frames 131. The tip of the pole 160 is positioned above the handlebar 132. The tablet terminal 110 is attached to the tip portion of the pole 160 with a screen of the touch panel 15 facing the front side. The reader 18 is attached to the tablet terminal 110 so that a card slit faces the front side. In FIG. 3, the reader 18 is a magnetic card reader. The camera 19 is attached to the middle part of the pole 160 to capture an image of the entire shopping basket 150 placed in the basket receiving portion 140 from above.

The battery 170 is attached to the lower end side of the handle frame portion 130 between the bottom portions of the vertical frames 131. The battery 170 serves as a power source for the tablet terminal 110, the registration scanner 16, the cancelation scanner 17, the reader 18, and the camera 19.

FIG. 4 is a hardware block diagram of the virtual POS server 50. The virtual POS server 50 includes a processor 51, a main memory 52, an auxiliary storage device 53, a communication interface 54, and a system transmission line 55. The system transmission line 55 is an address bus, a data bus, a control signal line, or the like. In the virtual POS server 50, the processor 51, the main memory 52, the auxiliary storage device 53, and the communication interface 54 are connected to the system transmission line 55.

The processor 51 controls each component of the virtual POS server 50 in order to perform various functions thereof according to an operating system and/or one or more application programs. The processor 51 is, for example, a CPU.

The main memory 52 includes a nonvolatile memory area and a volatile memory area. The nonvolatile memory area of the main memory 52 stores the operating system and/or the application programs. The non-volatile and/or volatile memory areas of the main memory 52 may store data necessary for the processor 51 to execute a process for controlling each component of the virtual POS server 50. The volatile memory area of the main memory 52 is used as a work area in which data is temporarily stored by the processor 11. The nonvolatile memory area is, for example, a ROM. The volatile memory area is, for example, a RAM.

The auxiliary storage device 53 is, for example, an EEPROM, an HDD, an SSD, or the like. The auxiliary storage device 53 stores data used when the processor 51 performs various kinds of processes, or data created by the process of the processor 51, and the like. The auxiliary storage device 53 may store the application programs described above.

The communication interface 54 is connected to the network 2. The communication interface 54 performs data communication with other devices connected via the network 2 according to a communication protocol.

The virtual POS server 50 having such a configuration uses a part of the volatile memory area of the main memory 52 to store a purchase registration list 521. The virtual POS server 50 can generate and store a plurality of purchase registration lists 521 in this area.

FIG. 5 depicts a data structure of the purchase registration list 521. As illustrated in FIG. 5, the purchase registration list 521 stores a set of a member ID, purchased commodity data 522 (see FIG. 6), a total amount, and a checkout code. The total amount is a total price of the commodities indicated in the purchased commodity data 522. The checkout code will be described later. The purchase registration list 521 is generated in correlation with the member ID that has been input via the information terminal 10.

FIG. 6 depicts a data structure of the purchased commodity data 522. As illustrated in FIG. 6, the purchased commodity data 522 is composed of a commodity code, a commodity name, a price, the number of purchased items, a purchase amount, a cancelation flag, and the like of each purchased commodity purchased by the user. The number of purchased items is the number of purchases of the commodity identified by the commodity code, and the purchase amount is a total of prices based on the number of purchased items. The cancelation flag is flag data for specifying a commodity that was once registered as a purchased commodity but was subsequently canceled. The cancelation flag is set to "1" when the registration of the purchased commodity has been canceled during shopping. An initial state of the cancelation flag is "0".

FIGS. 7 to 10 are flowcharts of a main control procedure performed by the processor 11 of the information terminal 10. FIGS. 11 to 14 are flowcharts of a main control procedure performed by the processor 51 of the virtual POS server 50.

Hereinafter, using the flowcharts, a main operation of the information processing system 1 that is performed when a user who is a member of a store performs registration of a purchased commodity and checkout by using the information terminal 10 of the cart 100 will be described. The operation described below is an example. Any procedure may be used as long as similar results can be obtained.

First, a user who shops using the cart 100 touches the touch panel 15. When the touch panel 15 is touched, the processor 11 which has been in an idle state starts the information processing illustrated in the flowchart of FIG. 7.

The processor 11 causes the touch panel 15 to display a login screen, as ACT 1. The login screen is a screen for instructing a member to perform a login operation. A user who is a member of a store has a member card on which their member code is recorded. The user who confirms the login screen causes the reader 18 to read data of the member card. When the data of the member card is read by the reader 18, the data of the member card is acquired by the processor 11.

The processor 11 that has caused the login screen to be displayed is waiting for login, as ACT 2. When the processor 11 acquires the data from the reader 18 and confirms that the data is data of the member card including a member ID, the processor 11 determines that the login has been performed. That is, the processor 11 determines YES in ACT 2 and proceeds to ACT 3.

The processor 11 controls the wireless unit 14 to transmit a login command to the virtual POS server 50, as ACT 3. Therefore, the wireless unit 14 wirelessly transmits the login command. The login command is received by the access point 70 and sent to the virtual POS server 50 via the network 2. The login command includes the member ID of the member card read by the reader 18.

Upon receipt of a command from the information terminal 10 via the communication interface 54, the processor 51 of the virtual POS server 50 confirms a type of the command. Then, when the received command is the login command, the processor 51 starts a command receiving process of the procedure illustrated in the flowchart of FIG. 11.

The processor 51 detects the member ID from the login command, as ACT 41. Then, the processor 51 authenticates a member identified by the member ID, as ACT 42. Specifically, the processor 51 inquires the member server 40 whether a member data record including the member ID exists in the member database. As a result, when a response that the corresponding member data record exists in the member database is received from the member server 40, the processor 51 determines that the member authentication is valid. In contrast, when a response that the corresponding member data record does not exist in the member database is received from the member server 40, the processor 51 determines that the member authentication is invalid.

The processor 51 confirms the result of the member authentication, as ACT 43. Here, when the authentication result is invalid, the processor 51 determines NO in ACT 43 and proceeds to ACT 44. The processor 51 controls the communication interface 54 to transmit a denial response command to the information terminal 10, as ACT 44. Therefore, the denial response command is transmitted via the communication interface 54. The denial response command is wirelessly transmitted from the access point 70 via the network 2 and received by the information terminal 10 that is a transmission source of the login command. With the above, the processor 51 ends the login command receiving process.

When the authentication result is valid, the processor 51 determines YES in ACT 43 and proceeds to ACT 45. The processor 51 requests the member server 40 for member data of the member identified by the member ID and acquires the member data including the member ID from the member server 40, as ACT 45.

The processor 51 creates the purchase registration list 521 in the main memory 52, as ACT 46. Then, the processor 51 registers the member ID in the purchase registration list 521.

The processor 51 controls the communication interface to transmit an approval response command to the information terminal 10, as ACT 47. Therefore, the approval response command is transmitted via the communication interface 54. The approval response command is wirelessly transmitted from the access point 70 via the network 2 and received by the information terminal 10 that is the transmission source of the login command. With the above, the processor 51 ends the login command receiving process.

Figure 7:
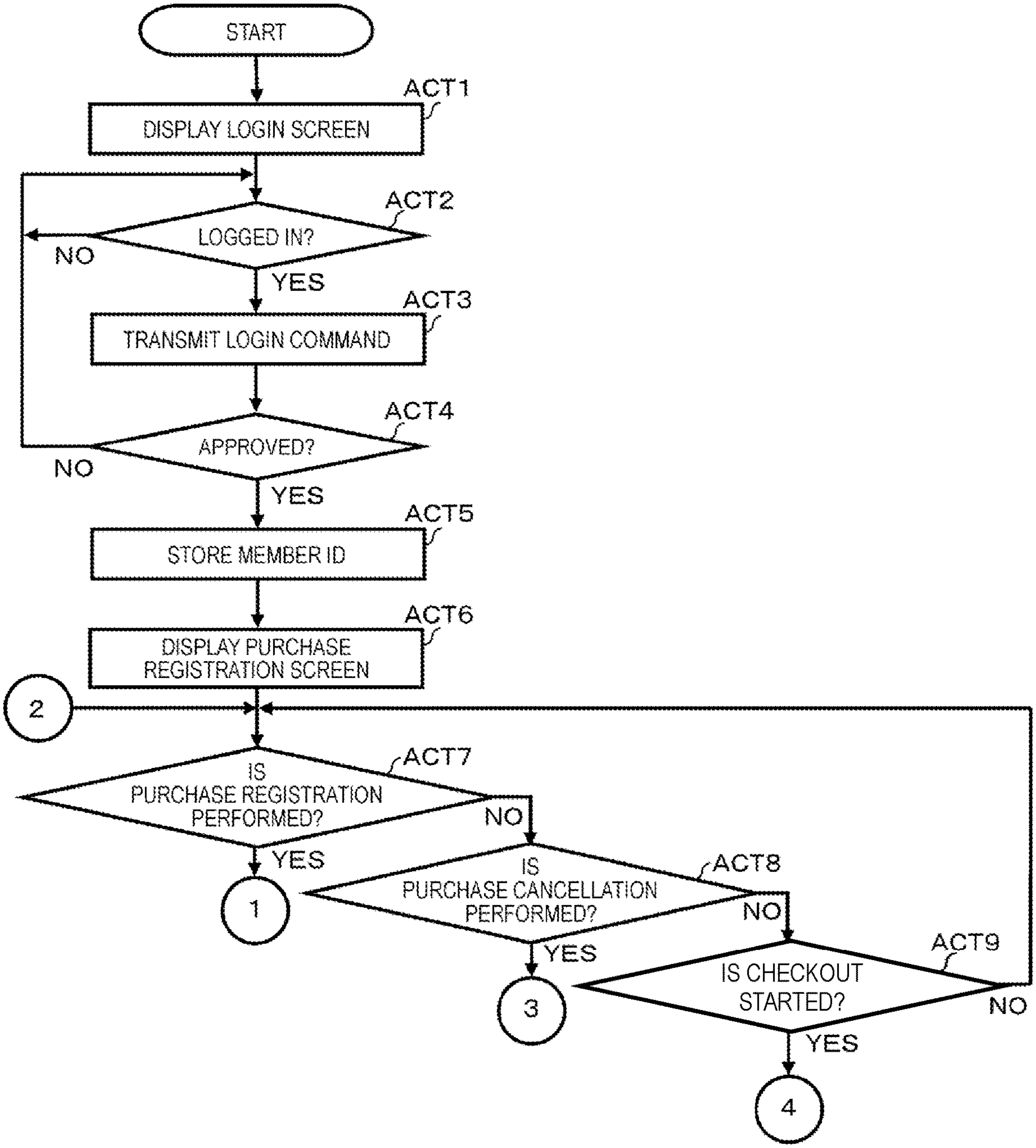
FIG. 7 through FIG. 10 are each flowcharts of a control procedure performed by an information terminal.

Refer back to the description of FIG. 7.

The processor 11 of the information terminal 10 that controls transmission of the login command in ACT 3 waits for a response command from the virtual POS server 50, as ACT 4. When the denial response command is received from the virtual POS server 50, the processor 11 determines NO in ACT 4 and returns to ACT 2. Therefore, the user logs in again.

When the approval response command is received from the virtual POS server 50, the processor 11 determines YES in ACT 4 and proceeds to ACT 5. The processor 11 stores the member ID included in the approval response command in the main memory 12, as ACT 5. The processor 11 causes the touch panel 15 to display a purchase registration screen 200 (see FIG. 15), as ACT 6.

Figure 15:
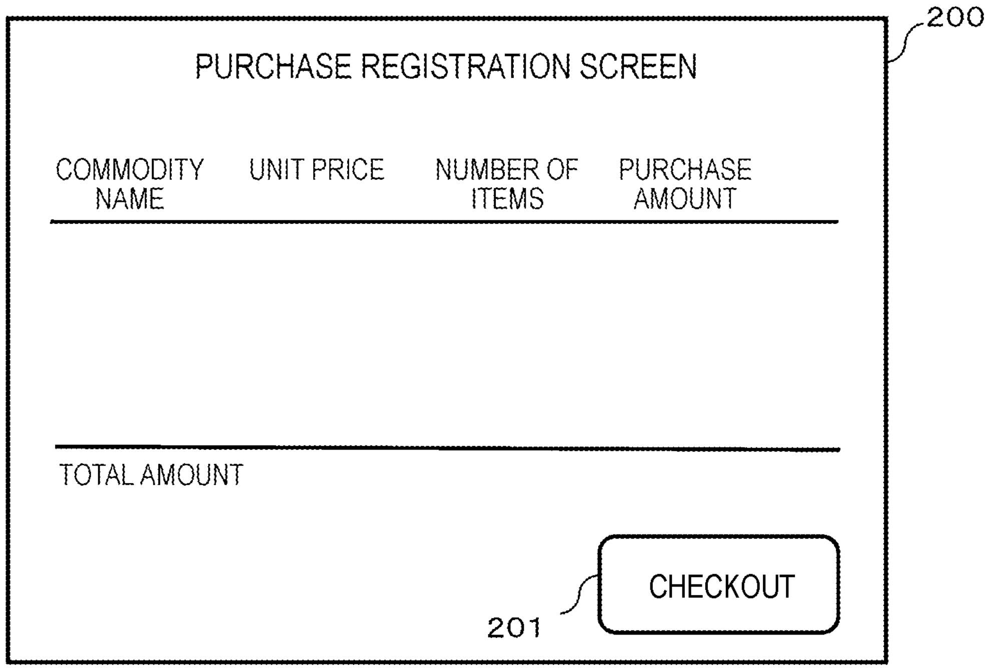
FIG. 15 is a schematic diagram illustrating an example of a purchase registration screen displayed on an information terminal.

FIG. 15 is a schematic diagram illustrating an example of the purchase registration screen 200. As illustrated in FIG. 15, on the purchase registration screen 200, areas for displaying a commodity name, a unit price, the number of items, a purchase amount, and a total amount of a purchased and registered commodity are displayed. An image of a checkout button 201 for starting checkout is displayed.

The user who has confirmed the purchase registration screen 200 goes around the sales floor and store a purchased commodity in the cart 100. For example, the user places the purchased commodity into the shopping basket 150 placed on the basket receiving portion 140. Before placing the purchased commodity into the shopping basket 150, the user operates the registration scanner 16 to read the barcode attached to the purchased commodity. When the barcode is read by the registration scanner 16, the commodity identified by the commodity code represented by the barcode is registered.

Refer back to the description of FIG. 7.

The processor 11 confirms whether purchase registration has been performed, as ACT 7. When the processor 11 confirms that the purchase registration has been performed by reading the barcode attached to the purchased commodity by the registration scanner 16, the processor 11 determines YES in ACT 7 and proceeds to ACT 11 in FIG. 8.

The processor 11 controls the wireless unit 14 to transmit a purchase registration command to the virtual POS server 50, as ACT 11. Therefore, the wireless unit 14 wirelessly transmits the purchase registration command to the virtual POS server 50. The purchase registration command is received by the access point 70 and sent to the virtual POS server 50 via the network 2. The purchase registration command includes the member ID stored in the main memory 12 and the commodity code of the purchased commodity.

Figure 12:
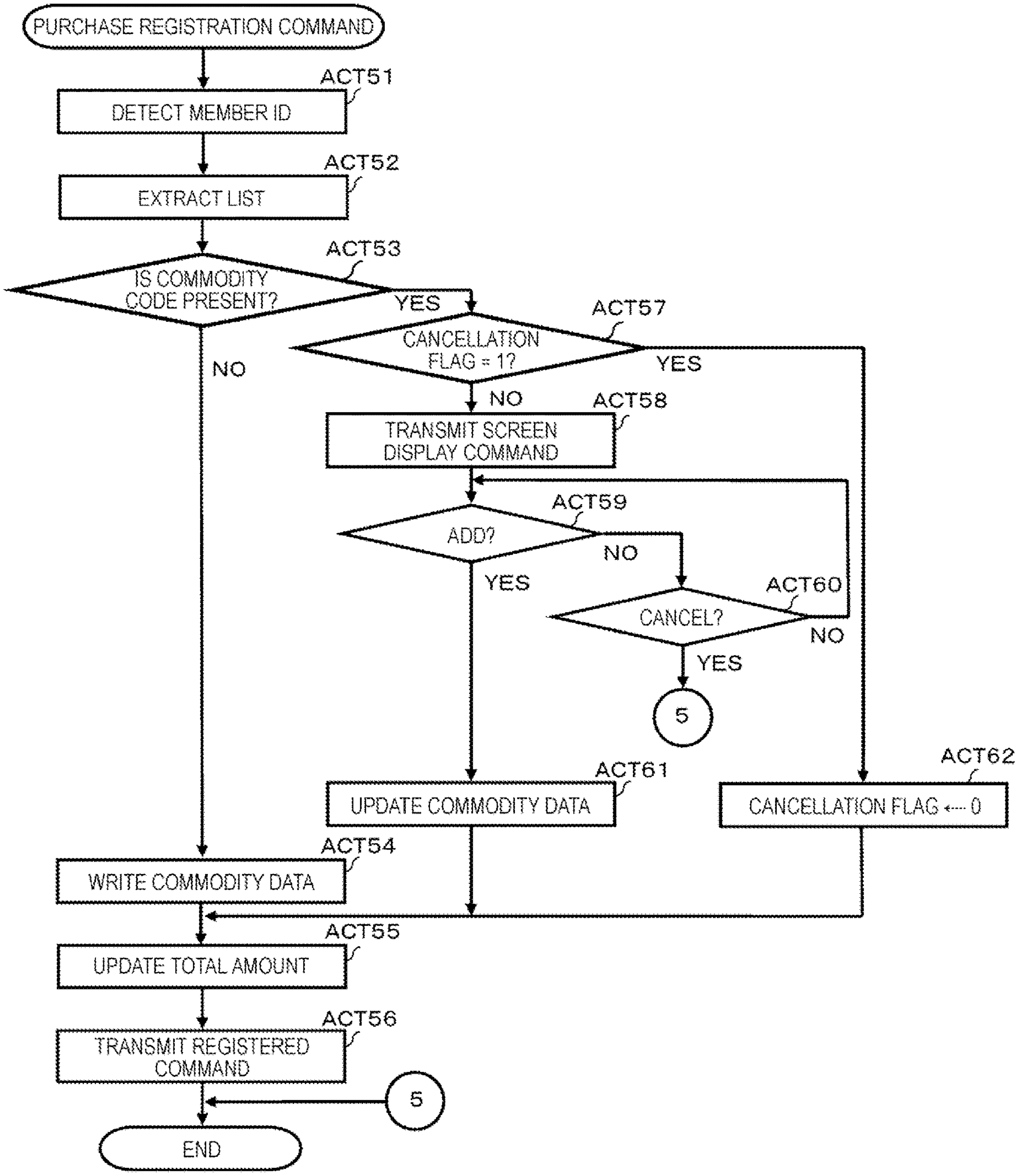

The processor 51 of the virtual POS server 50 that has acquired the purchase registration command starts the command receiving process of the procedure illustrated in the flowchart of FIG. 12.

The processor 51 detects the member ID from the purchase registration command, as ACT 51. Then, the processor 51 extracts the purchase registration list 521 associated with the detected member ID as a processing target, as ACT 52.

The processor 51 confirms whether the commodity code included in the purchase registration command is present in the purchase commodity data 522 of the purchase registration list 521, as ACT 53. When the commodity code is not present in the purchased commodity data 522, the processor 51 determines NO in ACT 53 and proceeds to ACT 54.

The processor 51 generates the purchased commodity data 522 based on the commodity code and writes the purchased commodity data 522 into the purchase registration list 521, as ACT 54. The processor 51 updates the total amount of the purchase registration list 521 to the amount obtained by adding the purchase amount of the newly written purchased commodity data 522, as ACT 55.

The processor 51 controls the communication interface to transmit a registered command to the information terminal 10, as ACT 56. Therefore, the registered command is transmitted to the information terminal 10 via the communication interface 54. The registered command is wirelessly transmitted from the access point 70 via the network 2 and received by the information terminal 10 that is a transmission source of the purchase registration command. The registered command includes the member ID and the purchased commodity data 522. With the above, the processor 51 ends the purchase registration command receiving process.

On the other hand, when the commodity code is present in the purchased commodity data 522, the processor 51 determines YES in ACT 53 and proceeds to ACT 57. The processor 51 confirms whether the cancelation flag stored in the main memory 52 is "1", as ACT 57.

When the cancelation flag is not "1", that is, when the cancelation flag is "0", the processor 51 determines NO in ACT 57 and proceeds to ACT 58.

The processor 51 controls the communication interface 54 to transmit a screen display command to the information terminal 10, as ACT 58. Therefore, the screen display command is transmitted to the information terminal 10 via the communication interface 54. The screen display command is wirelessly transmitted from the access point 70 via the network 2 and received by the information terminal 10 that is the transmission source of the purchase registration command. The screen display command includes screen data of a confirmation screen. The confirmation screen will be described later.

Figure 8:
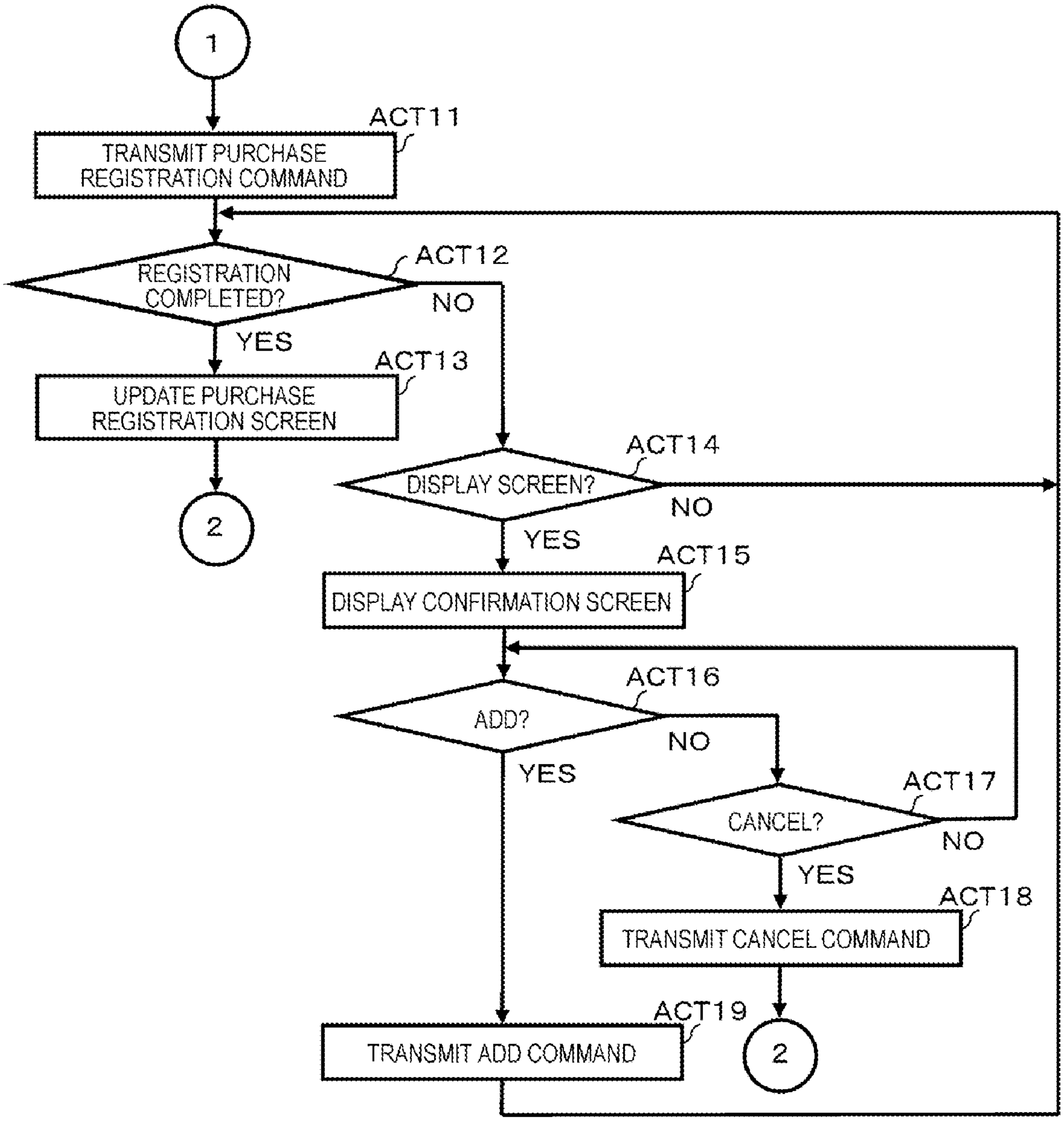

Refer back to the description of FIG. 8.

The processor 11 of the information terminal 10 that has transmitted the purchase registration command in ACT 11 waits for the registered command from the virtual POS server 50, as ACT 12. When the registered command is received from the virtual POS server 50, the processor 11 determines YES in ACT 12 and proceeds to ACT 13.

The processor 11 updates the purchase registration screen 200, as ACT 13. That is, the processor 11 updates the purchase registration screen 200 so that the commodity name, the unit price, the number of items, and purchase amount of the purchased commodity are added and the purchase amount is added to the total amount. Then, the processor 11 returns to ACT 7 of FIG. 7.

When the registered command has not been received from the virtual POS server 50, the processor 11 determines NO in ACT 12 and proceeds to ACT 14. The processor 11 confirms whether the screen display command has been received from the virtual POS server 50, as ACT 14. When the screen display command has not been received, the processor 11 determines NO in ACT 14 and returns to ACT 12.

When the screen display command has been received, the processor 11 determines YES in ACT 14 and proceeds to ACT 15. The processor 11 causes the touch panel 15 to display a confirmation screen 300 (see FIG. 16), as ACT 15.

Figure 16:
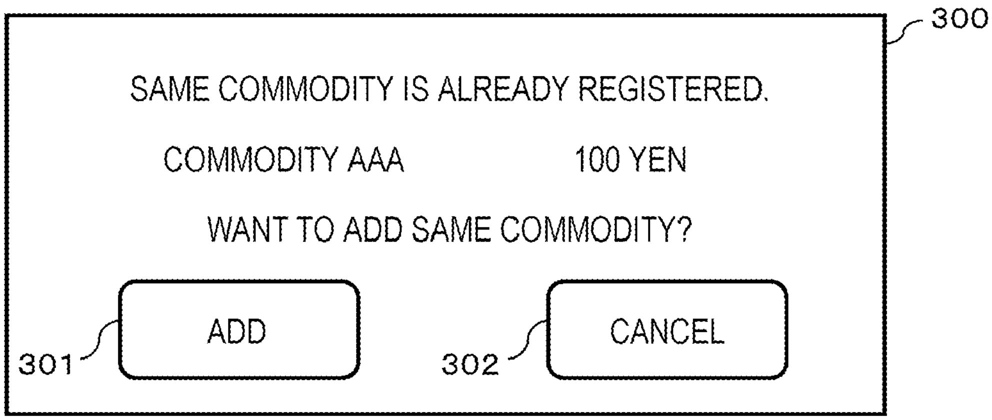
FIG. 16 is a schematic diagram illustrating an example of a confirmation screen displayed on an information terminal.

FIG. 16 is a schematic view illustrating an example of the confirmation screen 300. The confirmation screen 300 is a screen for notifying the user that an already registered purchased commodity has been read again by the registration scanner 16. As illustrated in FIG. 16, on the confirmation screen 300, text data for notifying that the purchased commodity has already been registered and inquiring whether to add and register the purchased commodity is displayed. On the confirmation screen 300, an image of an add button 301 and an image of a cancel button 302 are displayed. The add button 301 is touched when the user adds and registers the purchased commodity that has already been registered. The cancel button 302 is touched when the user does not add the registration of the purchased commodity that has already been registered. The text shown in FIG. 16 is an example.

Refer back to the description of FIG. 8.

The processor 11 confirms whether the add button 301 of the confirmation screen 300 is touched, as ACT 16. When the add button 301 is not touched, that is, when the cancel button 302 is touched, the processor 11 determines NO in ACT 16 and proceeds to ACT 17.

The processor 11 confirms whether the cancel button 302 is touched, as ACT 17. When the cancel button 302 is not touched, the processor 11 determines NO in ACT 17 and returns to ACT 16. That is, the processor 11 returns to a standby state of ACT 16 to ACT 17.

When the cancel button 302 is touched, the processor 11 determines YES in ACT 17 and proceeds to ACT 18. The processor 11 controls the wireless unit 14 to transmit a cancel command to the virtual POS server 50, as ACT 18. Therefore, the wireless unit 14 wirelessly transmits the cancel command to the virtual POS server 50. The cancel command is received by the access point 70 and sent to the virtual POS server 50 via the network 2. The cancel command includes the member ID stored in the main memory 12 and the commodity code of the purchased commodity. Then, the processor 11 returns to ACT 7 of FIG. 7. That is, the confirmation screen 300 is erased, and the screen of the touch panel 15 returns to the purchase registration screen 200.

On the other hand, when the additional button 301 is touched, the processor 11 determines YES in ACT 16 and proceeds to ACT 19. The processor 11 controls the wireless unit 14 to transmit an add command to the virtual POS server 50, as ACT 19. Therefore, the wireless unit 14 wirelessly transmits the add command to the virtual POS server 50. The add command is received by the access point 70 and sent to the virtual POS server 50 via the network 2. The add command includes the member ID stored in the main memory 12 and the commodity code of the purchased commodity. Then, the processor 11 returns to the standby state of ACT 12 and ACT 14. Therefore, the processor 11 repeatedly executes the process of ACT 12 to ACT 19.

Refer back to the description of FIG. 12.

The processor 51 of the virtual POS server 50 that has transmitted the image display command in ACT 58 waits for the add command from the information terminal 10, as ACT 59. When the add command has not been received from the information terminal 10, the processor 51 determines NO in ACT 59 and proceeds to ACT 60.

The processor 51 confirms whether the cancel command has been received from the information terminal 10, as ACT 60. When the cancel command has not been received, the processor 51 determines NO in ACT 60 and returns to ACT 59. That is, the processor 11 returns to the standby state of ACT 59 to ACT 60.

When the cancel command has been received from the information terminal 10, the processor 51 determines YES in ACT 60 and ends the purchase registration command receiving process.

When the add command has been received from the information terminal 10, the processor 51 determines YES in ACT 59 and proceeds to ACT 61. The processor 51 updates the number of purchased items and the purchased amount written in the same line as the commodity code included in the add command in the purchased commodity data 522 to the added number of items and amount, as ACT 61. Then, the processor 51 proceeds to ACT 55. That is, the processor 51 updates the total amount in the purchase registration list 521 and controls the communication interface 54 to transmit the registered command to the information terminal 10.

On the other hand, when the cancelation flag is "1", the processor 51 determines YES in ACT 57 and proceeds to ACT 62. The processor 51 updates the cancelation flag of the purchased commodity data 522 from "1" to "0", as ACT 62. This happens when the user once registers a purchased commodity, but then cancels and registers the purchased commodity again, for example. Then, the processor 51 proceeds to ACT 55. That is, the processor 51 updates the total amount in the purchase registration list 521 and controls the communication interface 54 to transmit the registered command to the information terminal 10. With the above, the processor 51 ends the purchase registration command receiving process.

Refer back to the description of FIG. 7.

When the purchase registration has not been performed, the processor 11 determines NO in ACT 7 and proceeds to ACT 8. The processor 11 confirms whether the purchase cancelation has been performed, as ACT 8. For example, when canceling the registration of a purchased commodity, the user reads the barcode attached to the purchased commodity with the cancelation scanner 17. When the barcode is read by the cancelation scanner 17, the purchased commodity identified by the commodity code represented by the barcode is canceled.

Figure 9:
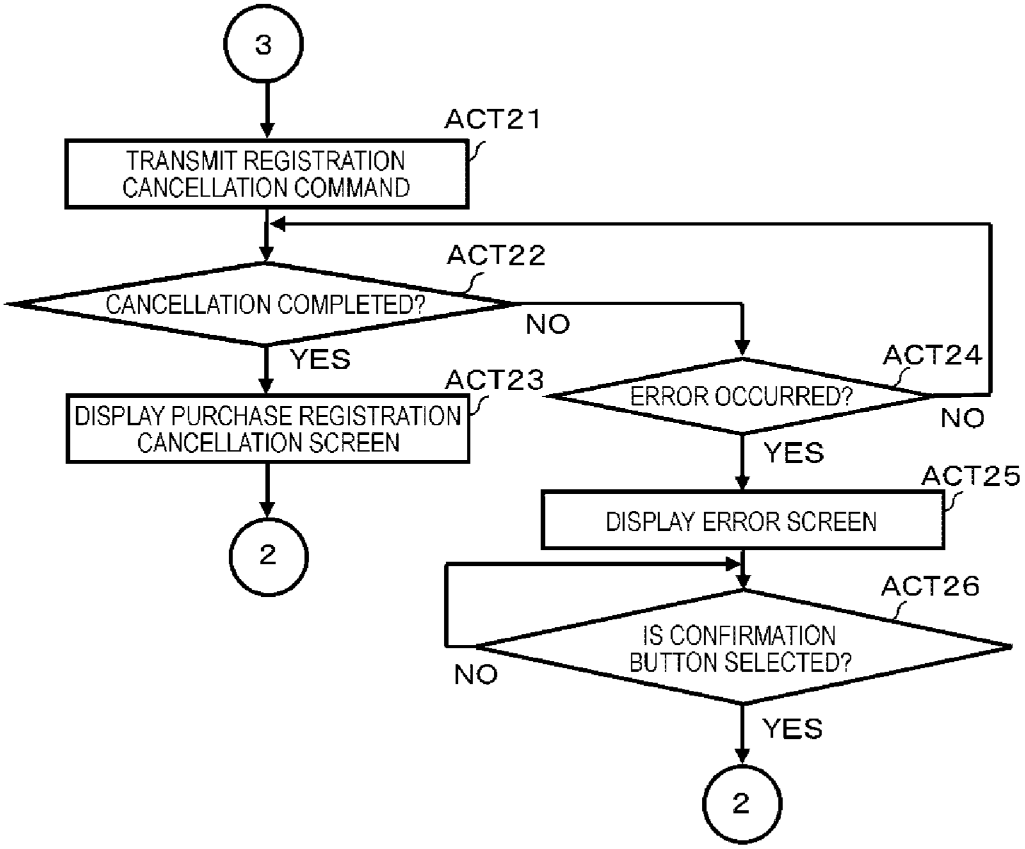

When it is confirmed that the purchase registration has been canceled by reading the barcode attached to the purchased commodity with the cancelation scanner 17, the processor 11 determines YES in ACT 8 and proceeds to ACT 21 in FIG. 9.

The processor 11 controls the wireless unit 14 to transmit a registration cancelation command to the virtual POS server 50, as ACT 21. Therefore, the wireless unit 14 wirelessly transmits the registration cancelation command to the virtual POS server 50. The registration cancelation command is received by the access point 70 and sent to the virtual POS server 50 via the network 2. The registration cancelation command includes the member ID stored in the main memory 12 and the commodity code of the purchased commodity whose registration is being canceled.

Figure 13:
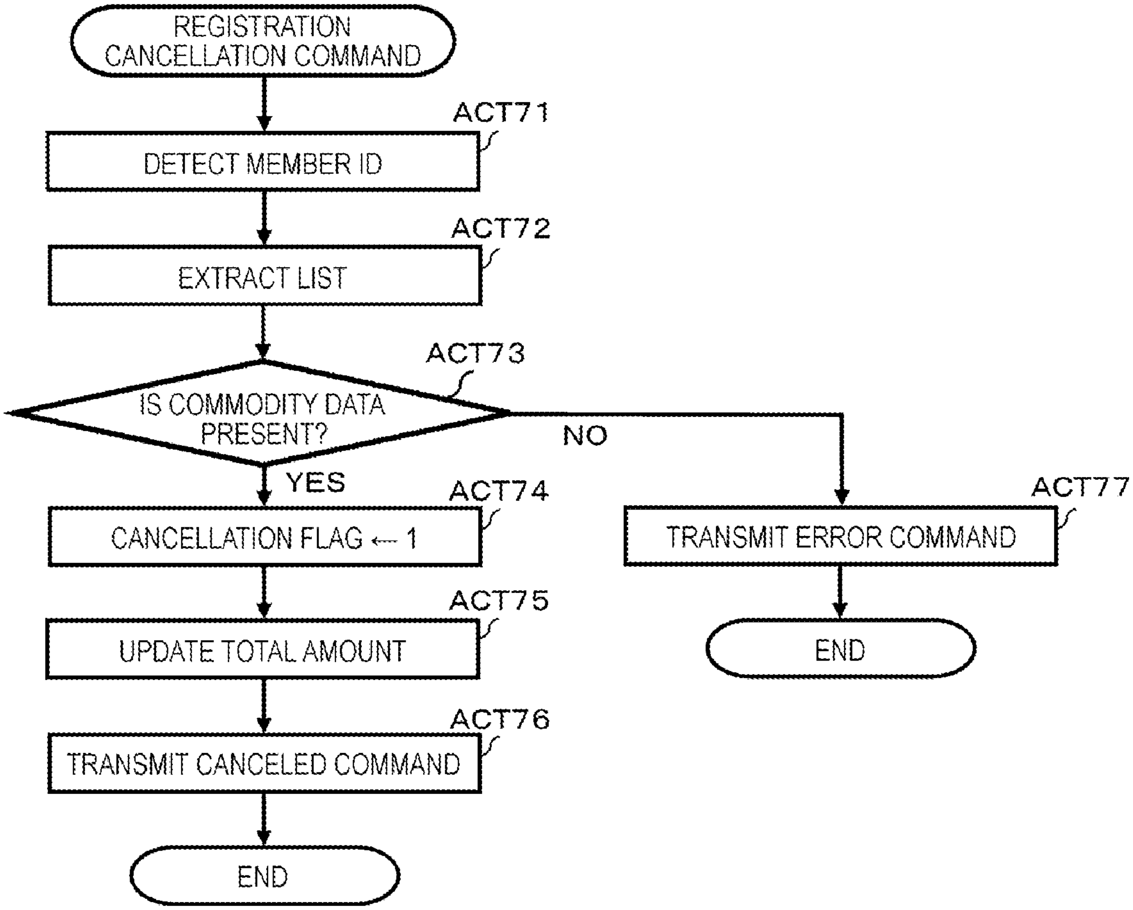

The processor 51 of the virtual POS server 50 that has received the registration cancelation command starts the command receiving process illustrated in the flowchart of FIG. 13.

The processor 51 detects the member ID from the registration cancelation command, as ACT 71. Then, the processor 51 extracts the purchase registration list 521 associated with the detected member ID as a processing target, as ACT 72.

The processor 51 confirms whether the commodity code included in the registration cancelation command is present in the purchased commodity data 522 of the purchase registration list 521, as ACT 73. When the commodity code is present in the purchased commodity data 522, the processor 51 determines YES in ACT 73 and proceeds to ACT 74.

The processor 51 updates the cancelation flag of the purchased commodity data 522 from "0" to "1", as ACT 74. The processor 51 updates the total amount of the purchase registration list 521 to the amount obtained by subtracting the purchase amount of the commodity whose purchase registration is being canceled, as ACT 75.

The processor 51 controls the communication interface to transmit a canceled command to the information terminal 10, as ACT 76. Therefore, the canceled command is transmitted to the information terminal 10 via the communication interface 54. The canceled command is wirelessly transmitted from the access point 70 via the network 2 and received by the information terminal 10 that is a transmission source of the registration cancelation command. The canceled command includes the member ID and the purchased commodity data 522. With the above, the processor 51 ends the registration cancelation command receiving process.

When the commodity code is not present in the purchased commodity data 522, the processor 51 determines NO in ACT 73 and proceeds to ACT 77. The processor 51 controls the communication interface 54 to transmit an error command to the information terminal 10, as ACT 77. Therefore, the error command is transmitted to the information terminal 10 via the communication interface 54. The error command is wirelessly transmitted from the access point 70 via the network 2 and received by the information terminal 10 that is the transmission source of the registration cancelation command. The error command includes screen data of an error screen. The error screen will be described later. With the above, the processor 51 ends the registration cancelation command receiving process.

Refer back to the description of FIG. 9.

The processor 11 of the information terminal 10 that has transmitted the registration cancelation command in ACT waits for the canceled command from the virtual POS server 50, as ACT 22. When the canceled command has been received from the virtual POS server 50, the processor 11 determines YES in ACT 22 and proceeds to ACT 23. The processor 11 causes the touch panel 15 to display a purchase registration cancelation screen 400 (see FIG. 17), as ACT 23. Then, the processor 11 returns to ACT 7 of FIG. 7.

Figure 17:
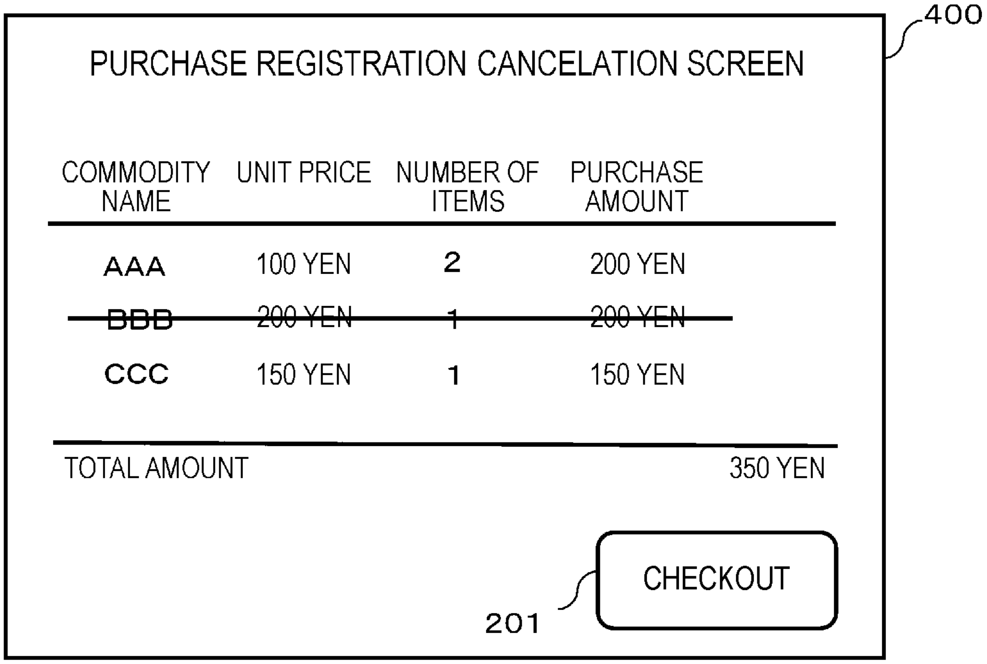
FIG. 17 is a schematic diagram illustrating an example of a purchase registration cancelation screen displayed on an information terminal.

FIG. 17 is a schematic diagram illustrating an example of the purchase registration cancelation screen 400. As illustrated in FIG. 17, on the purchase registration cancelation screen 400, a cancelation line is displayed over the commodity name, the unit price, the number of items, and the purchase amount of the commodity whose purchase registration has been canceled. The total amount of the purchase registration cancelation screen 400 is displayed by subtracting the purchase amount of the commodity whose purchase registration has been canceled. The text shown in FIG. 17 is an example.

Refer back to the description of FIG. 9.

When the canceled command has not been received from the virtual POS server 50, the processor 11 determines NO in ACT 22 and proceeds to ACT 24. The processor 11 confirms whether the error command has been received from the virtual POS server 50, as ACT 24. When the error command has not been received, the processor 11 determines NO in ACT 24 and returns to ACT 22.

When the error command has been received, the processor 11 determines YES in ACT 24 and proceeds to ACT 25. The processor 11 causes the touch panel 15 to display an error screen 500 (see FIG. 18), ACT 25.

Figure 18:
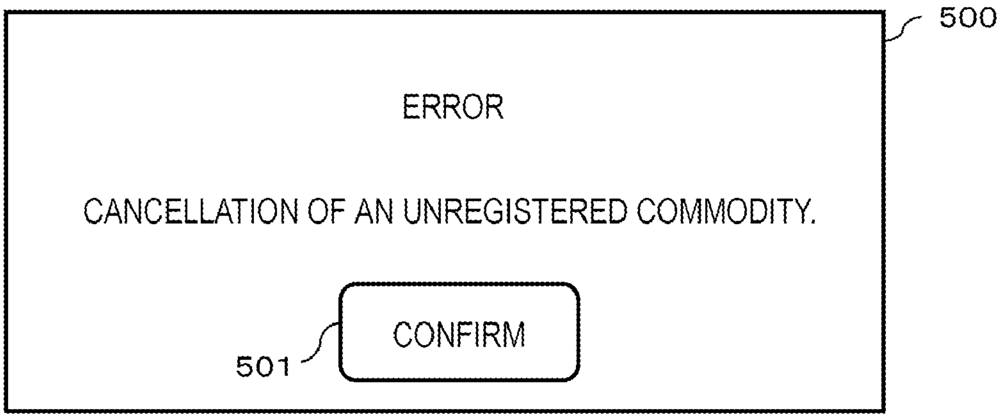
FIG. 18 is a schematic diagram illustrating an example of an error screen displayed on an information terminal.

FIG. 18 is a schematic diagram illustrating an example of the error screen 500. The error screen 500 is a screen for notifying the user that the purchased commodity read by the cancelation scanner 17 has not been registered. As illustrated in FIG. 18, the error screen 500 displays an image of a confirmation button 501 together with text data notifying that the purchased commodity has not been registered. The confirmation button 501 is touched when the user confirms the content of the error screen 500. The text shown in FIG. 18 is an example.

Refer back to the description of FIG. 9.

The processor 11 confirms whether the confirmation button 501 is touched, as ACT 26. When the confirmation button 501 is touched, the processor 11 determines YES in ACT 26 and returns to ACT 7 of FIG. 7. That is, the error screen 500 is erased, and the screen of the touch panel 15 returns to the purchase registration screen 200.

Refer back to the description of FIG. 7.

When the purchase has not been canceled, the processor determines NO in ACT 8 and proceeds to ACT 9. The processor 11 confirms whether checkout is started, as ACT 9.

As described above, the image of the checkout button 201 is displayed on a part of the purchase registration screen 200. The user who finished the purchase touches the checkout button 201. The processor 11 recognizes that checkout has been started when the checkout button 201 is touched. When checkout is not started, the processor 11 determines NO in ACT 9 and returns to ACT 7. That is, the processor 11 returns to the standby state of ACT 7 to ACT 9.

Figure 10:
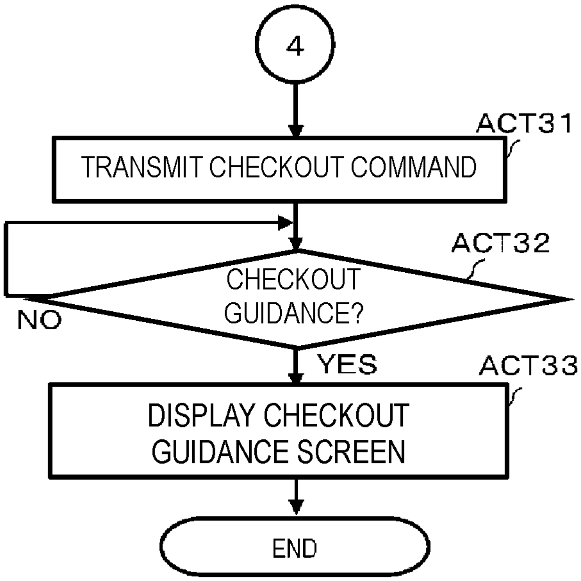
Figure 11:
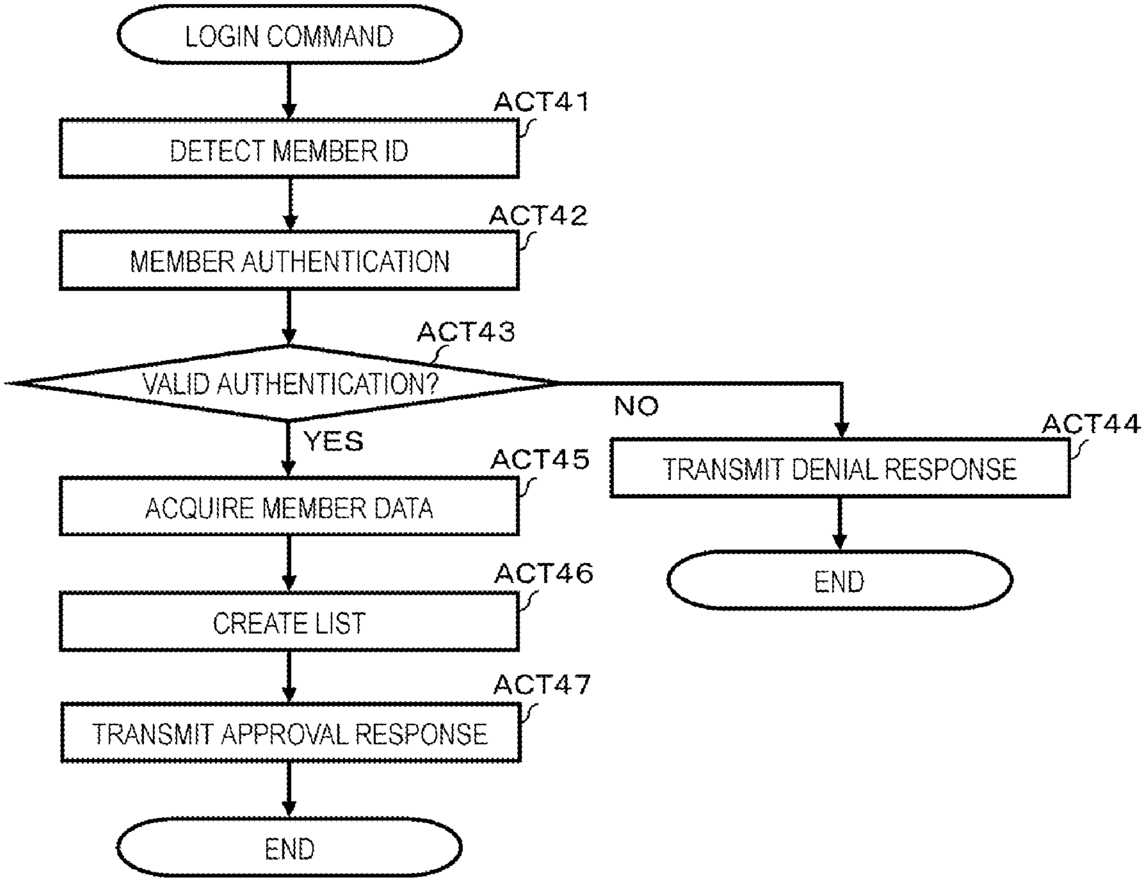
FIG. 11 through FIG. 14 are each flowcharts of a control procedure performed by a virtual POS server.

When it is confirmed that checkout has been started, the processor 11 determines YES in ACT 9 and proceeds to ACT 31 of FIG. 10. The processor 11 controls the wireless unit 14 to transmit a checkout command to the virtual POS server 50, as ACT 31. Therefore, the wireless unit 14 wirelessly transmits the checkout command to the virtual POS server 50. The checkout command is received by the access point 70 and sent to the virtual POS server 50 via the network 2. The checkout command includes the member ID stored in the main memory 12.

Figure 14:
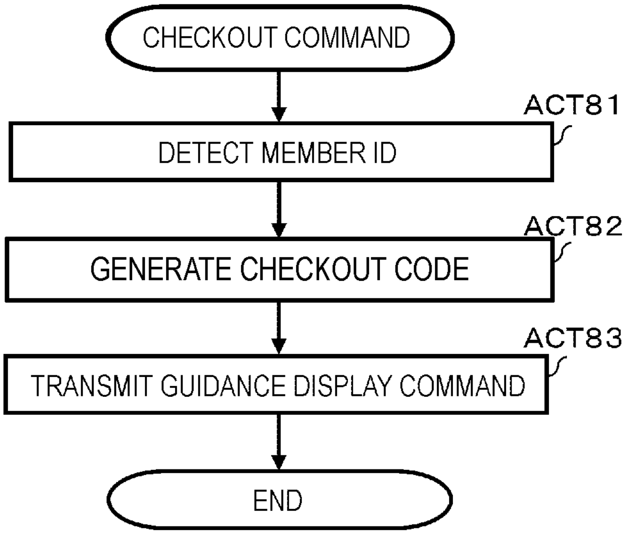

The processor 51 of the virtual POS server 50 that has received the checkout command starts the command receiving process illustrated in the flowchart of FIG. 14.

The processor 51 detects the member ID from the checkout command, as ACT 81. Then, the processor 51 generates data of the checkout code, as ACT 82. The checkout code is for identifying a user who performs checkout with the checkout machine 60. The checkout code is generated on a per user basis who performs checkout with the checkout machine 60.

The processor 51 controls the communication interface 54 to transmit a guidance display command to the information terminal 10, as ACT 83. Therefore, the guidance display command is transmitted to the information terminal 10 via the communication interface 54. The guidance display command is wirelessly transmitted from the access point 70 via the network 2 and received by the information terminal 10 that is a transmission source of the checkout command. The guidance display command includes image data of the checkout barcode representing the checkout code generated in ACT 82. With the above, the processor 51 ends the checkout command receiving process.

Refer back to the description of FIG. 10.

The processor 11 of the information terminal 10 that has transmitted the checkout command in ACT 31 waits for the guidance display command from the virtual POS server 50, as ACT 32. When the guidance display command has been received from the virtual POS server 50, the processor 11 determines YES in ACT 32 and proceeds to ACT 33.

The processor 11 causes the touch panel 15 to display a checkout guidance screen, as ACT 33. On the checkout guide screen, for example, a checkout barcode and a message prompting the checkout barcode to be scanned by the checkout machine 60 are displayed. With the above, the processor 11 ends information processing illustrated in the flowchart of FIGS. 7 to 10.

The user who has confirmed the checkout guide screen goes to a checkout lane of the store where the checkout machine 60 is installed and uses a scanner of the checkout machine 60 that reads the checkout barcode. Then, the purchase registration list 521 in which the checkout code of the checkout barcode is set is sent from the virtual POS server 50 to the checkout machine 60. After that, well-known checkout processing such as cash payment, credit card payment, and electronic money payment is executed by the checkout machine 60.

As described above, the information processing system 1 includes the information terminal 10 and the virtual POS server 50. The information terminal 10 includes a first reading unit, that is, the registration scanner 16, and a second reading unit, that is, the cancelation scanner 17, for reading a commodity code. The virtual POS server 50 is connected to the information terminal 10 via the network 2.

The processor 11 of the information terminal 10 executes the process of ACT 5 of FIG. 7. That is, the information terminal 10 acquires identification information for identifying the user.

The processor 11 of the information terminal 10 executes the process of ACT 11 of FIG. 8. That is, the information terminal 10 transmits first data including the commodity code read by the registration scanner 16 and the identification information to the virtual POS server 50.

The processor 11 of the information terminal 10 executes the process of ACT 21 of FIG. 9. That is, the information terminal 10 transmits second data including the commodity code read by the cancelation scanner 17 and the identification information to the virtual POS server 50.

The processor 51 of the virtual POS server 50 executes the processes of ACT 54, ACT 55, ACT 61, and ACT 62 of FIG. 12. That is, when the first data is received from the information terminal 10, the virtual POS server 50 registers data of the purchased commodity, that is, the purchased commodity data 522, which is identified by the commodity code, in the list correlated with the identification information, that is, the purchase registration list 521.

The processor 51 of the virtual POS server 50 executes the processes of ACT 74 and ACT 75 of FIG. 13. That is, when the second data is received from the information terminal 10, the virtual POS server 50 cancels the purchased commodity data 522 identified by the commodity code from the purchase registration list 521 correlated with the identification information.

Therefore, in such an information processing system 1, when the user operates the registration scanner 16 of the information terminal 10 to read the barcode attached to a purchased commodity, a purchase registration command including the member ID and the commodity code represented by the barcode is transmitted to the virtual POS server 50. Then, the purchased commodity data 522 is written and registered in the purchase registration list 521 of the virtual POS server 50. On the other hand, when the user operates the cancelation scanner 17 to read the barcode attached to a purchased commodity, a registration cancelation command including the member ID and the commodity code of the commodity whose registration is being canceled is transmitted to the virtual POS server 50. Then, the purchase commodity data 522 and the purchase registration list 521 of the virtual POS server 50 are updated according to the cancelation. Therefore, even when a commodity is once registered as a purchased commodity, the commodity registration can be canceled by a simple operation using the cancelation scanner 17.

The processor 51 of the virtual POS server 50 executes the processes of ACT 51 to ACT 53, ACT 57, and ACT 58 of FIG. 12. That is, when the first data is received from the information terminal 10, the virtual POS server 50 checks whether the purchased commodity data 522 identified by the commodity code included in the first data is registered in the purchase registration list 521 correlated with the identification information, and notifies the information terminal 10 of the check result.

The processor 51 of the virtual POS server 50 executes the processes of ACT 71 to ACT 73 and ACT 77 of FIG. 13. That is, when the second data is received from the information terminal 10, the virtual POS server 50 checks whether the purchase commodity data 522 identified by the commodity code included in the second data is not registered in the purchase registration list 521 correlated with the identification information, and notifies the information terminal 10 of the check result.

Therefore, when a purchased commodity that has already been registered is read again by the registration scanner 16, the confirmation screen 300 for notifying the duplicated registration is displayed on the touch panel 15 of the information terminal 10. When the purchased commodity read by the cancelation scanner 17 is not registered, the error screen 500 for notifying the absence of the registration is displayed. Therefore, by displaying the confirmation screen 300 or the error screen 500, the user can grasp current registration of the correct purchased commodity.

Although embodiments of the information processing system, the information terminal, the information processing device, and the control program thereof have been described above, the embodiments are not limited thereto.

In the above embodiments, the information terminal 10 is attached to the cart 100. The information terminal 10 does not necessarily have to be attached to the cart 100. For example, a smartphone, a tablet terminal, or the like owned by a user may be used as the information terminal 10.

In the above embodiments, the registration scanner 16 is attached to the left side of the handlebar 132, and the cancelation scanner 17 is attached to the right side of the handlebar 132 when viewed from the user. For example, the registration scanner 16 may be attached to the right side of the handlebar 132, and the cancelation scanner 17 may be attached to the left side of the handlebar 132. The registration scanner 16 and the cancelation scanner 17 do not necessarily have to be attached to the handlebar 132.

In the above embodiments, the confirmation screen 300 and the error screen 500 are displayed on the touch panel 15. For example, the notifications of registration of a same commodity and the absence of registration of a commodity being canceled may be notified by voice.

In the above embodiments, the virtual POS server 50 performs the functions of a POS device by cooperating with the information terminal 10. For example, the virtual POS server 50 may further have functions as at least one of the store server 30 or the member server 40. In other words, the store server 30 or the member server 40 having the functions as the virtual POS server 50 may be used.

In the above embodiments, a code symbol such as a barcode or a two-dimensional barcode is attached to the commodity is illustrated. For example, a code symbol may be provided near a price tag disposed around the commodity such as fruits and vegetables, and the code symbol may be read by the registration scanner 16 and the cancelation scanner 17.

While certain embodiments have been described, the embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. These embodiments and modifications fall within the scope and spirit of the disclosure and fall within the invention described in the claims and their equivalents.

What is claimed is:

1. A point of sales (POS) system, comprising:

a POS server configured to store a list of commodities registered for purchase in association with identification information that identifies a customer; and a POS terminal attached to a shopping cart and comprising first and second scanners arranged along a handlebar of the shopping cart and through which a commodity code of a commodity is read, wherein the first and second scanners have respective reading windows facing a same direction crossing the handlebar, and the POS terminal is configured to:

acquire identification information that identifies a customer, read a commodity code through the first scanner, and transmit first data including the commodity code read through the first scanner and the acquired identification information to the POS server, and read a commodity code through the second scanner, and transmit second data including the commodity code read through the second scanner and the acquired identification information, to the POS server, wherein the POS server is further configured to:

receive the first data, and register the commodity having the commodity code included in the first data in the list, and receive the second data, and delete the commodity having the commodity code included in the second data from the list.

2. The POS system according to claim 1, wherein the POS server is further configured to:

receive the first data, determine that the commodity having the commodity code included in the first data has already been registered in the list, and transmit, to the POS terminal, information indicating that the commodity has already been registered.

3. The POS system according to claim 2, wherein the POS terminal is further configured to receive the information from the POS server, and display a screen indicating the information.

4. The POS system according to claim 3, wherein the POS terminal is further configured to accept an input for registering the same commodity through the screen, and the POS server is further configured to, in response to the input through the screen, register the same commodity in the list.

5. The POS system according to claim 3, wherein the POS terminal is further configured to accept an input for not registering the same commodity through the screen.

6. The POS system according to claim 1, wherein the POS server is further configured to:

receive the second data, determine that the commodity having the commodity code included in the second data has been registered in the list, and transmit, to the POS terminal, information indicating that the commodity has not been registered.

7. The POS system according to claim 6, wherein the POS terminal is further configured to receive the information from the POS server, and display a screen including the information.

8. The POS system according to claim 1, further comprising:

a checkout machine configured to perform checkout processing, wherein the POS terminal is further configured to receive an input of starting the checkout processing, and display a symbol that is readable by the checkout machine and specifies the list of the registered commodities.

9. The POS system according to claim 1, wherein the POS terminal further comprises a reader configured to read a medium in which the identification information is stored.

10. The POS system according to claim 1, wherein the reading windows face the direction that is opposite to a travelling direction of the shopping cart when the shopping cart is pushed.

11. A point of sales (POS) terminal attachable to a shopping cart, comprising:

a network interface configured to communicate with a POS server for storing a list of commodities registered for purchase in association with identification information that identifies a customer;

first and second scanners through which a commodity code on a commodity can be read, wherein the first and second scanners are arranged along a handlebar of the shopping cart and have respective reading windows facing a same direction crossing the handlebar; and a processor configured to:

acquire the identification information that identifies the customer, control the first scanner to read a commodity code, and control the network interface to transmit a registration request including the commodity code read through the first scanner and the acquired identification information to the POS server, and control the second scanner to read a commodity code, and control the network interface to transmit a cancellation request including the commodity code read through the second scanner and the acquired identification information to the POS server.

12. The POS terminal according to claim 11, further comprising:

a display, wherein the processor is further configured to acquire information from the POS server indicating that the commodity having the commodity code included in a registration request has already been registered, and control the display to display a screen indicating the information.

13. The POS terminal according to claim 12, wherein the processor is further configured to detect an input for registering the commodity through the screen.

14. The POS terminal according to claim 12, wherein the processor is further configured to detect an input for not registering the commodity through the screen.

15. The POS terminal according to claim 11, further comprising:

a display, wherein the processor is further configured to acquire information from the POS server indicating that the commodity having the commodity code included in a cancelation request has not been previously registered, and control the display to display a screen indicating the information.

16. The POS terminal according to claim 11, further comprising:

a display, wherein the processor is further configured to receive an input of starting checkout processing, and control the display to display a symbol that is readable by a checkout machine and specifies the list of the registered commodities.

17. The POS terminal according to claim 11, wherein the reading windows face the direction that is opposite to a travelling direction of the shopping cart when the shopping cart is pushed.

18. A commodity registration method for a point of sales (POS) system, the method comprising:

storing, in a POS server, a list of commodities registered for purchase in association with identification information that identifies a customer;

acquiring the identification information through a POS terminal attached to a shopping cart and comprising first and second scanners that are arranged along a handlebar of the shopping cart and have respective reading windows facing a same direction crossing the handlebar;

reading a commodity code of a commodity through the first scanner of the POS terminal, and transmitting first data including the commodity code read through the first scanner and the acquired identification information from the POS terminal to the POS server;

reading a commodity code of a commodity through the second scanner of the POS terminal, and transmitting second data including the commodity code read through the second scanner and the acquired identification information from the POS terminal to the POS server;

receiving the first data by the POS server, and registering the commodity having the commodity code included in the first data in the list; and receiving the second data by the POS server, and deleting the commodity having the commodity code included in the second data from the list.

19. The commodity registration method according to claim 18, wherein the reading windows face the direction that is opposite to a travelling direction of the shopping cart when the shopping cart is pushed.

* * * * *